(12) United States Patent
Chen et al.

(10) Patent No.: US 7,253,992 B2
(45) Date of Patent: Aug. 7, 2007

(54) SINGLE-POLE RECORDING HEAD HAVING TRAPEZOIDAL MAIN POLE AND BEVEL ANGLE PROMOTION LAYER AND METHODS OF FABRICATING THE SAME

(75) Inventors: Tsung Yuan Chen, San Jose, CA (US); Yimin Hsu, Sunnyvale, CA (US); Yinshi Lui, Foster City, CA (US)

(73) Assignee: Hitachi Global Storage Technologies Netherlands, B.V. (NL)

( * ) Notice: Subject to any disclaimer, the term of this patent is extended or adjusted under 35 U.S.C. 154(b) by 365 days.

(21) Appl. No.: 10/981,354

(22) Filed: Nov. 4, 2004

(65) Prior Publication Data
US 2006/0092568 A1    May 4, 2006

(51) Int. Cl.
*G11B 5/147*   (2006.01)
(52) U.S. Cl. ..................................... 360/126
(58) Field of Classification Search ................ 360/126, 360/123, 119
See application file for complete search history.

(56) References Cited

U.S. PATENT DOCUMENTS

| | | | |
|---|---|---|---|
| 6,504,675 B1 | 1/2003 | Shukh et al. | 360/125 |
| 6,687,084 B2 | 2/2004 | Takahashi et al. | 360/126 |
| 6,697,221 B2 | 2/2004 | Sato et al. | 360/126 |
| 6,710,973 B2 | 3/2004 | Okada et al. | 360/125 |
| 2003/0112555 A1 | 6/2003 | Sato et al. | 360/126 |
| 2003/0151850 A1 | 8/2003 | Nakamura et al. | 360/125 |
| 2004/0032692 A1 | 2/2004 | Kobayashi | 360/126 |
| 2004/0037002 A1 | 2/2004 | Kudo et al. | 360/126 |
| 2004/0042118 A1 | 3/2004 | Notsuke et al. | 360/126 |
| 2005/0068665 A1* | 3/2005 | Le et al. | 360/97.01 |

FOREIGN PATENT DOCUMENTS

| | | |
|---|---|---|
| JP | 60-136015 | 7/1985 |
| JP | 63-29311 | 2/1988 |
| JP | 2003203311 | 7/2003 |
| JP | 2003263705 | 9/2003 |
| JP | 2004095006 | 3/2004 |

OTHER PUBLICATIONS

Okada et al., "Fabrication Process for a Trapezoidal Main Pole for Single-Pole-Type Heads", IEEE Trans. On Magnetics, vol. 38, No. 5, Sep. 2002, pp. 2249-2252.

* cited by examiner

*Primary Examiner*—Angel Castro
(74) *Attorney, Agent, or Firm*—Silicon Valley Patent Group LLP; Omkar K. Suryadevara

(57) ABSTRACT

A single-pole perpendicular magnetic recording head contains a bevel angle promotion layer that facilitates the fabrication of the bevel angle in a trapezoidal main pole. The bevel angle promotion layer is made of a non-magnetic material that is softer than the material (e.g., $Al_2O_3$) that normally underlies the main pole. In one embodiment, the bevel angle promotion layer is formed between an end of the yoke and the air bearing surface (ABS), with the top surface of the bevel angle promotion layer being substantially coplanar with the top surface of the yoke. In other embodiment the bevel angle promotion layer is integrated with a leading edge taper material, which is formed of a magnetic material, to broaden the magnetic flux path between the yoke and the main pole.

11 Claims, 14 Drawing Sheets

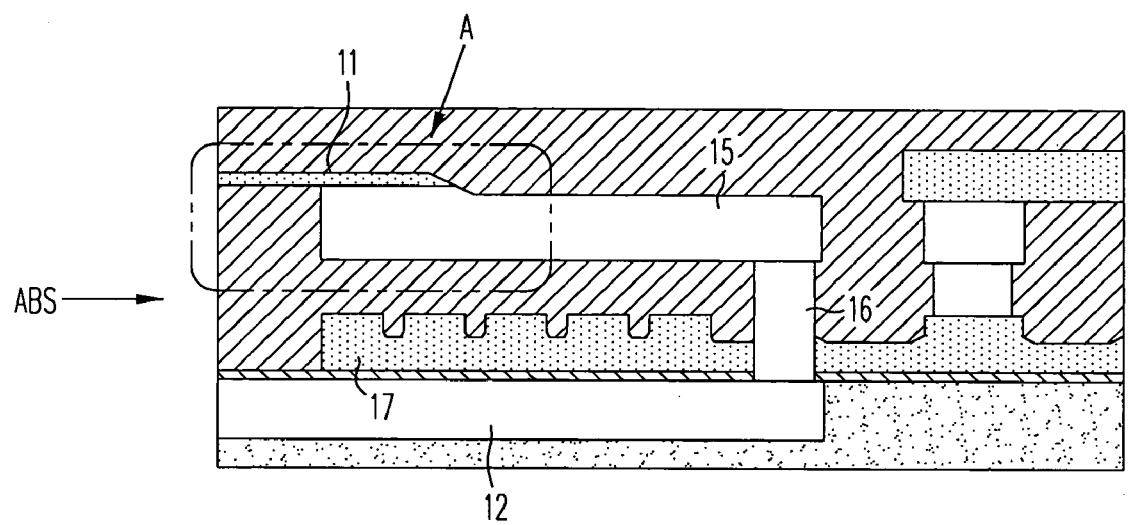
FIG. 4
(Prior Art)
FIG. 5A
(Prior Art)
FIG. 5B
(Prior Art)

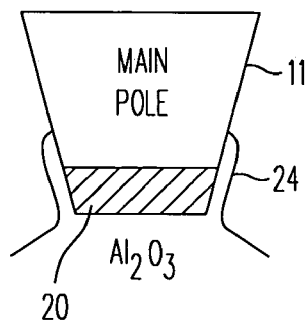 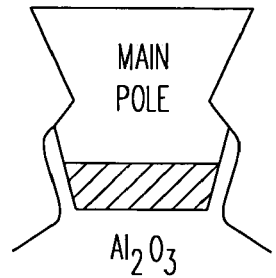
*FIG. 9A*  *FIG. 9B*
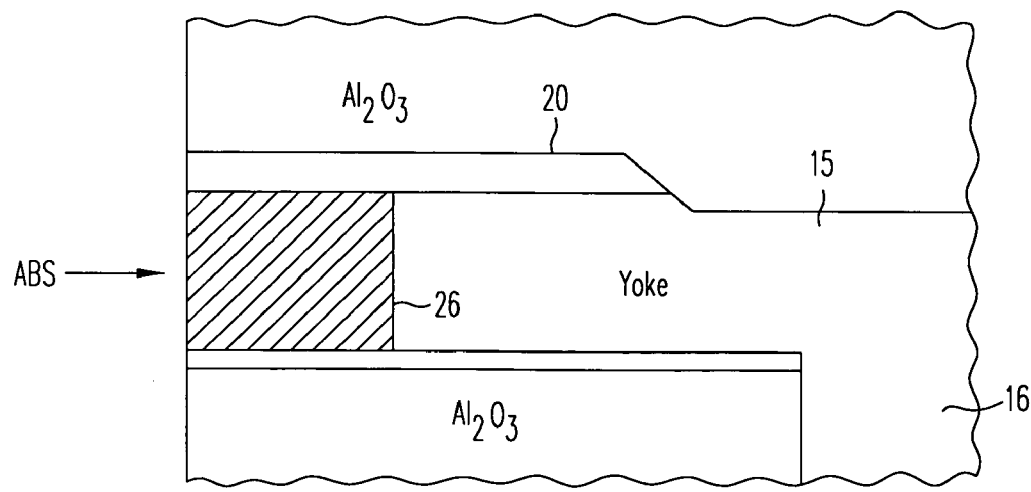
*FIG. 10*

SINGLE-POLE RECORDING HEAD HAVING TRAPEZOIDAL MAIN POLE AND BEVEL ANGLE PROMOTION LAYER AND METHODS OF FABRICATING THE SAME

FIELD OF THE INVENTION

This invention relates to single-pole recording heads for disk drives and in particular to a structure and method for reducing cross-talk and improving the signal-to noise ratio in a head used for perpendicular recording on a magnetic disk.

BACKGROUND

In perpendicular magnetic recording the data is recorded on a magnetic disk in which the easy axis of magnetization is aligned perpendicular to the surface of the disk. The recording head, viewed from the air bearing surface, contains a relatively small main pole and a relatively large auxiliary pole.

The recording head is normally mounted on a rotary arm which pivots about a stationary axis to move the head to various radial positions on the disk. This generates a skew angle $\theta$ between the main axis of the rotary arm and the tangential direction of the data tracks on the disk. This is illustrated schematically in FIGS. 1A-1C. In FIG. 1A the skew angle $\theta$ is equal to zero, i.e., the main axis of rotary arm 2 is exactly parallel to the data track on disk 4 that underlies the recording head 3 at the end of rotary arm 2. In FIG. 1B, where the recording had 3 is located nearer to the center of disk 4, the skew angle is equal to $\theta_1$. In FIG. 1C, where recording head 3 is located nearer to the edge of disk 4, the skew angle is equal to $\theta_2$ (which would have a sign opposite to that of $\theta_1$).

The existence of a skew angle creates the problem illustrated in FIG. 2A, which is a schematic top view of the main pole 5 over two data tracks T1 and T2. The skew angle is $\theta_3$. Although recording head 5 is writing to track T2, it is evident that a corner of head 5 overlies track T1. A solution to this problem is to fabricate the recording head with a trapezoidal shape, as shown in FIG. 2B. As shown, recording head 6 does not extend over track T1 when the skew angle is equal to $\theta_3$ because the sides of head 6 are canted by an angle $\alpha$, giving head 6 a trapezoidal shape.

FIG. 3 is general schematic view of a perpendicular recording head 10 taken from the air-bearing surface (ABS), showing a main pole 11, an auxiliary pole 12, a reading element 13 and a lower shield 14. For clarity, the components shown in FIG. 3 are not drawn to scale. The sides of main pole 11 are beveled by an angle $\alpha$. It should be noted that this invention does not involve the structure of the auxiliary pole, reading element or lower shield. These components are well known and can be fabricated in accordance with known techniques.

FIG. 4 is a view of recording head 10 taken through a cross section that is perpendicular to the ABS. Shown are the main pole 11 and the auxiliary pole 12. Also shown are a yoke 15, a back gap 16 and a coil 17. The main pole 11, auxiliary pole 12, yoke 15 and back gap 16 are made of a magnetic metal such as NiFe. The coil 16 is made of an electrically conductive metal such as Cu. The supporting layers separating these components are made of a hard nonconductive material such as alumina ($Al_2O_3$). In operation, an electrical signal through coil 17 generates a magnetic flux that flows through yoke 15 and main pole 11 in the direction of the ABS and from the head to a magnetic recording disk (not shown).

FIGS. 5A and 5B are views of main pole 11 from the ABS and show how the trapezoidal shape is normally fabricated. Initially, main pole 11 has a rectangular shape, as shown in FIG. 5A. An ion milling process is normally used to bevel the sides of main pole 11. As indicated by the arrows, the ion beam is directed to main pole 11 at an oblique angle so as to erode more material near the bottom of main pole 11. To erode both sides of the main pole, the ion beam can be programmed to change the angle of incidence in sequence.

FIG. 6 is a close-up view of the area designated A in FIG. 4, which is where most of the discussion herein is directed. The interface between the yoke 15 and the main pole 11 is shown, as well as the underlying and overlying alumina layers. The arrows denote the magnetic flux flowing from the yoke 15 to the main pole 11 and to the ABS.

One of the difficulties that has been encountered is to get a large enough bevel angle $\alpha$ in the main pole to avoid the problems of cross talk and signal-to-noise (STN) degradation described above. Conventionally, the layer directly below the main pole is made of alumina, which is a very hard material. The presence of this underlying alumina layer acts as a hard mask from below and makes it difficult to get a large bevel angle with the ion milling process. This can happen in two ways. First, the alumina layer retards the material of the main pole from being removed without over-milling. Second, during the milling process the alumina may redeposit onto the surfaces of the main pole, slowing down the removal process even more.

SUMMARY

According to this invention, a bevel angle promotion layer is formed beneath the layer of magnetic material that is to form the main pole. The main pole is not formed on a hard material such as $Al_2O_3$. The bevel angle promotion layer is formed of a non-magnetic material such as NiP, Rh, Ta, NiCr or Cd that is softer than $Al_2O_3$, (i.e., a material that is eroded more easily by ion milling than $Al_2O_3$). With the main pole formed on this softer material, it is much easier to obtain the required bevel angle with an ion milling process, without the formation of the "fences" that result when the main pole rests on a hard material such as $Al_2O_3$.

There are several embodiments within the scope of the invention. In a first embodiment, the bevel angle promotion layer is formed between an end of the yoke and the air bearing surface (ABS). A top surface of the bevel angle promotion layer is coplanar with a top surface of the yoke, and the bevel angle promotion layer has the same thickness as the yoke. The main pole overlaps the yoke, and the magnetic flux flows across an interface between the yoke and the main pole.

In an second embodiment, the bevel angle promotion layer is integrated with a leading edge tape layer to broaden the path through which the magnetic flux may flow between the yoke and the main pole.

The invention also includes methods of fabricating the embodiments of this invention.

BRIEF DESCRIPTION OF THE DRAWINGS

FIG. 4 is view of the recording head of FIG. 3 taken at a cross section perpendicular to the ABS.

FIGS. 5A and 5B illustrate conceptually the use of an ion milling process to form the beveled sides of a trapezoidal main pole.

FIGS. 9A and 9B illustrate the formation of a "fence" in a head wherein the main pole directly overlies an $Al_2O_3$ layer.

FIG. 10 is a cross-sectional view of a single pole recording head with a bevel angle promotion layer that does not overlap the yoke so as to constrict the magnetic flux path.

DETAILED DESCRIPTION

Figure 1C:
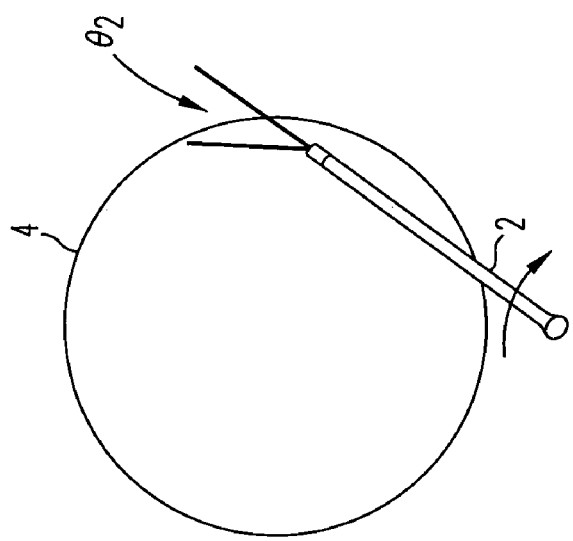
FIGS. 1A-1C illustrate how a skew angle is produced as a recording head mounted to a rotary arm sweeps across a magnetic disk.
Figure 1B:
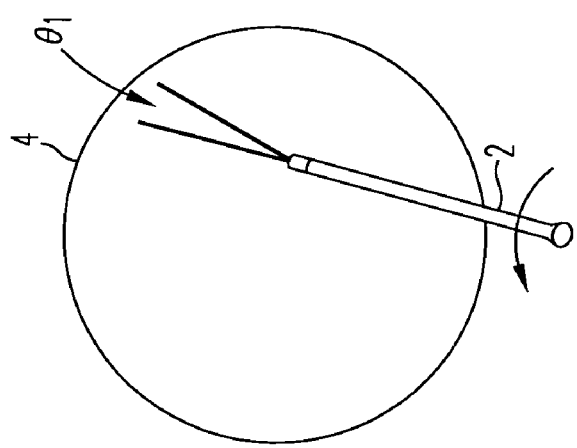
Figure 1A:
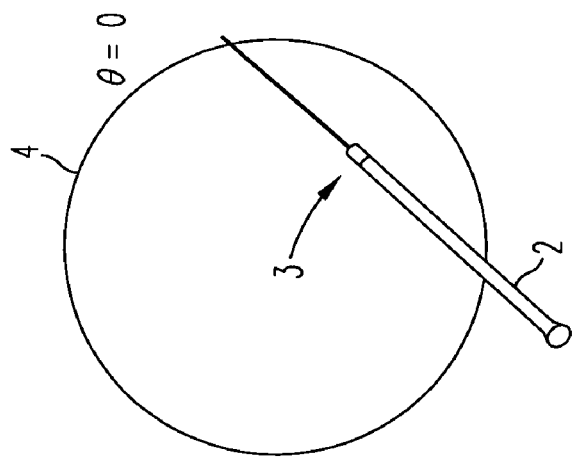
Figure 2A:
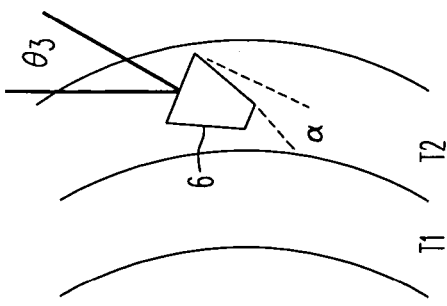
FIGS. 2A and 2B illustrate how cross talk can be reduced and the signal-to-noise ratio improved by forming the main pole of a recording head in a trapezoidal shape.
Figure 2B:
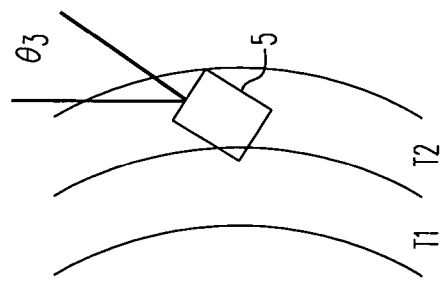
Figure 3:
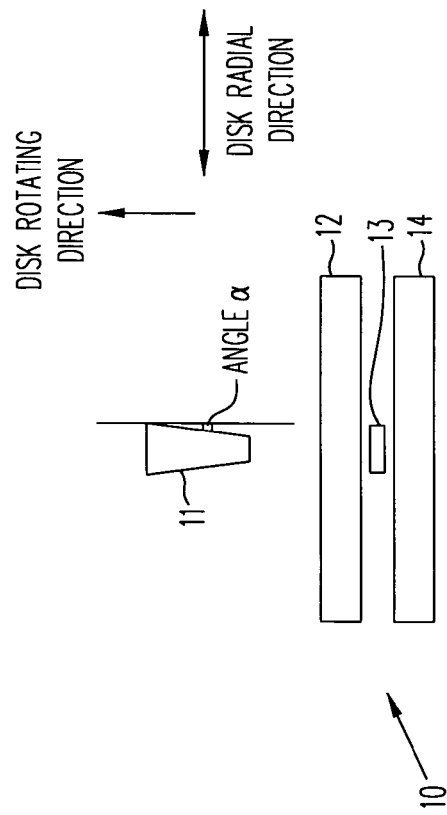
FIG. 3 is a schematic view from the ABS of a single pole type recording head having a trapezoidal main pole.
Figure 6:
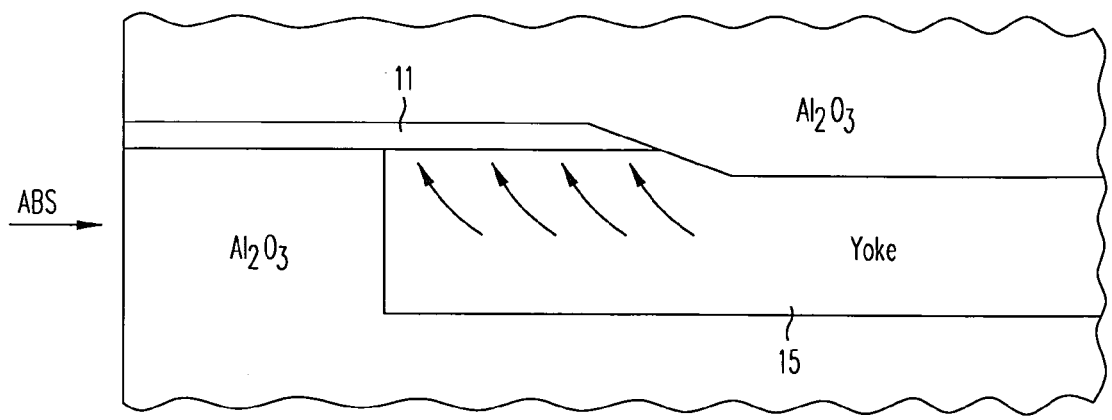
FIG. 6 is a cross-sectional view of a prior art recording head with no bevel angle promotion layer.
Figure 7:
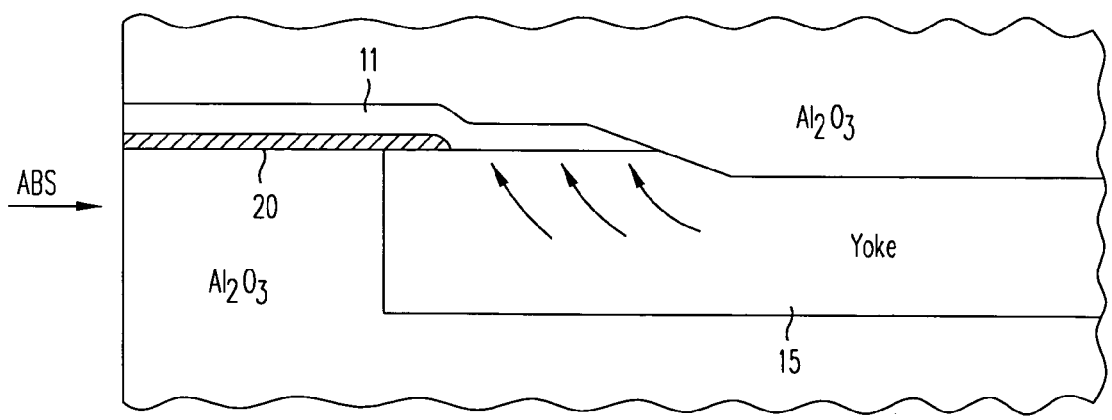
FIG. 7 is a cross-sectional view of a single pole recording head with a promotion layer that overlaps the yoke.

As described above, the presence of a hard alumina level directly beneath the main pole impedes the fabrication of a large bevel angle α using an ion milling process. One technique of overcoming this problem is to fabricate a relatively soft layer, which can be referred to as a "bevel angle promotion layer" or simply "promotion layer," immediately below the main pole. FIG. 7 illustrates a view similar to that of FIG. 6 but with a promotion layer 20 underneath main pole 11.

Figure 8A:
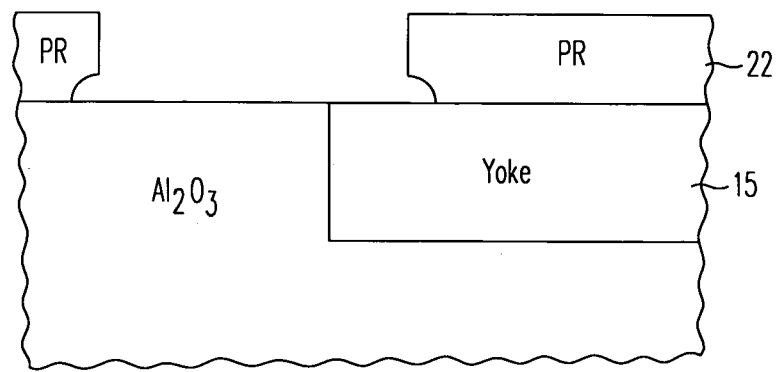
FIGS. 8A-8C illustrate a process of fabricating the recording head shown in FIG. 7.
Figure 8B:
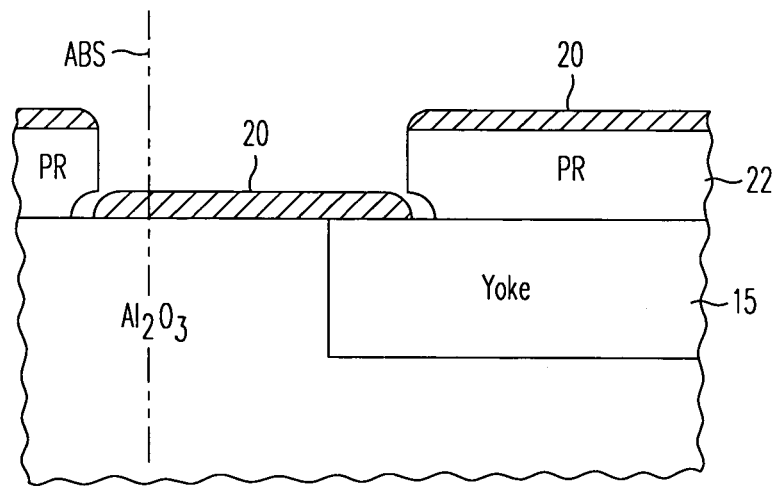
Figure 8C:
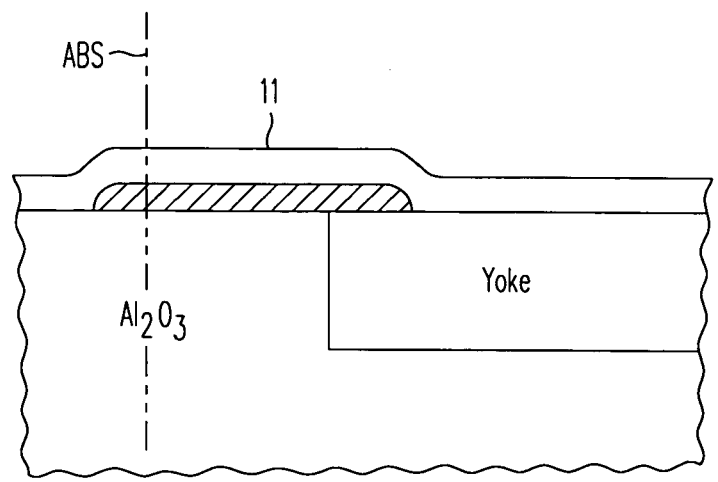

The promotion layer 11 may be fabricated by the process illustrated in FIGS. 8A-8C. Initially, the yoke 15 and underlying alumina layer are fabricated using known processes. Then, as shown in FIG. 8A, a "lift off" photoresist layer 22 is deposited and patterned with an aperture overlying a portion of yoke 15. A "lift" off photoresist layer is actually two photoresist layers which are patterned to produce the overhang shown in FIG. 8A.

Next, as shown in FIG. 8B, promotion layer 20 is deposited on the structure. Promotion layer 20 could include NiP, Rh, Ta, NiCr or Cd, for example. Lift off photoresist layer 22 is then removed (along with the overlying portion of promotion layer 20), and main pole 11 is deposited. Main pole 11 could be made of NiFe. Afterward, the overlying alumina layer is deposited, and the structure is lapped or polished to the location of the ABS (shown in FIGS. 8B and 8C), producing the head shown in FIG. 7.

One possible problem with this structure is illustrated in FIG. 7. Because the promotion layer 20 is made of a soft non-magnetic material, the overlap between promotion layer 20 and yoke 15 tends to reduce the area through which the magnetic flux must flow at the interface between yoke 15 and main pole 11.

Another possible problem is illustrated in FIG. 9A. With a relatively thin promotion layer 20 the ion beam may still strike the alumina layer, causing atoms of alumina to become dislodged and forming "fences" 24 that extend upwards along the sides of main pole 11. As the ion milling process continues, this can lead to a seriously deformed main pole, as shown in FIG. 9B.

These problems are overcome in the structure shown in FIG. 10. In this structure a thick promotion layer 26 is formed, having a top surface that is substantially coplanar with the top surface of the yoke 15. Thus, promotion layer 26 does not overlap yoke 15, and the flux flow across the interface between yoke 15 and main pole 11 is not restricted.

FIGS. 11A-11J illustrate a process that can be used to fabricate the structure of FIG. 10.

Figure 11A:
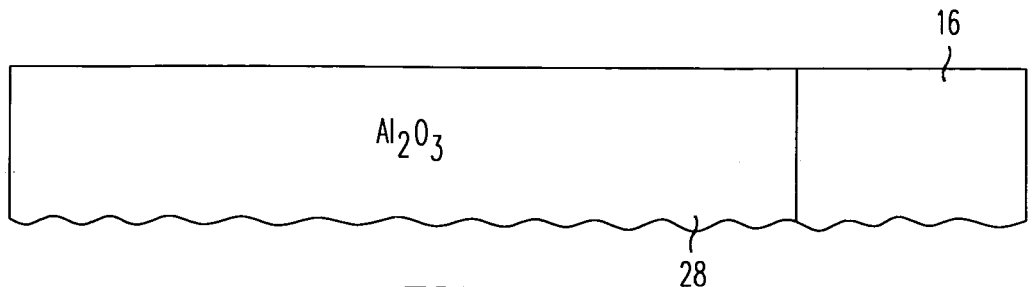
FIGS. 11A-11L illustrate a process of fabricating the recording head shown in FIG. 10.

The process to be described begins at the stage of the overall head fabrication process after the back gap 16 and an adjacent $Al_2O_3$ layer 28 have been formed. This is shown in FIG. 11A. The back gap 16 may be made of NiFe. The preceding stages of the process (e.g., the fabrication of the auxiliary pole and the coil) are conventional and will not be described here.

Figure 11B:
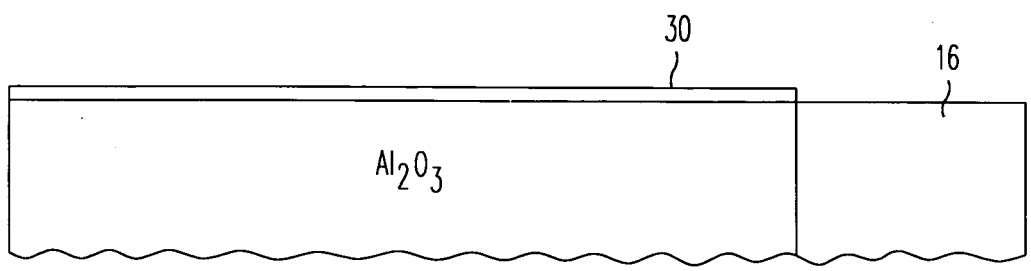

Referring to FIG. 11B, a NiP seed layer 30 is deposited on $Al_2O_3$ layer 28 by chemical vapor deposition, sputtering or some other deposition technique to a thickness of 1000 Å, for example. If desired, the seed layer can be removing from the back gap 16 by ion milling.

Figure 11C:
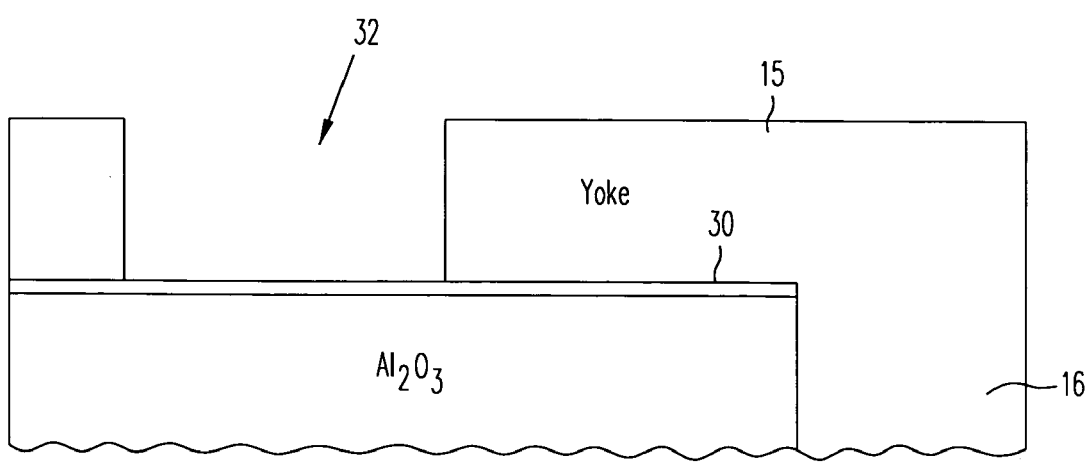

Next, as shown in FIG. 11C, yoke 15, typically made of NiFe, is plated onto back gap 16 and seed layer 30, with an opening in the area where the ABS is to be formed. A photoresist layer (not shown) is deposited in the opening area to prevent NiFe from being plated in that area. After yoke 15 has been plated, the photoresist layer is removed. Yoke 15 merges with back gap 16 to form a path for the magnetic flux.

Figure 11D:
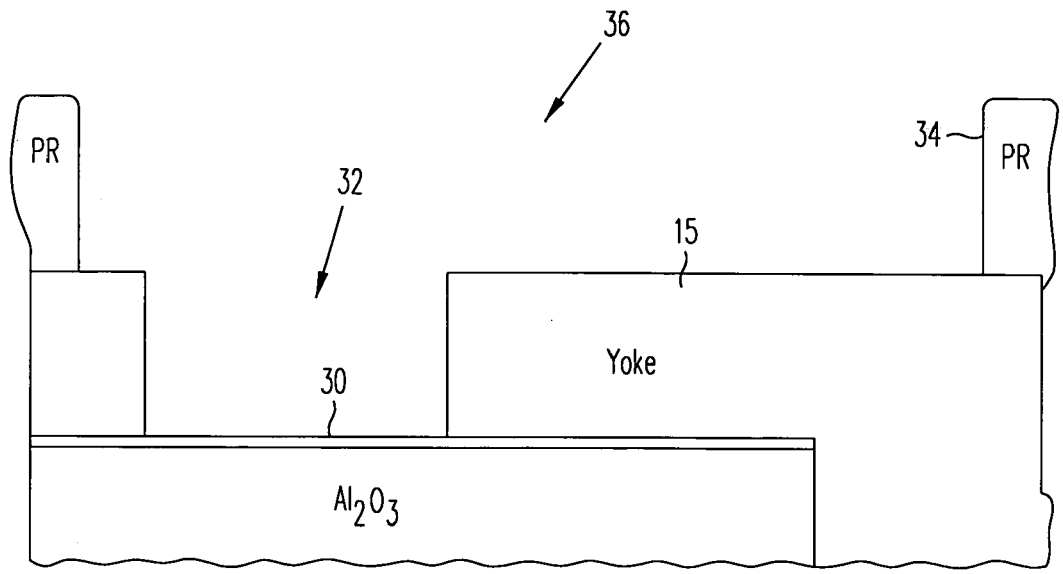

As shown in FIG. 11D, a photoresist layer 34 is deposited on yoke 15 and photoresist layer 34 is patterned to form an opening 36, which overlies opening 32 and a portion of yoke 15.

Figure 11E:
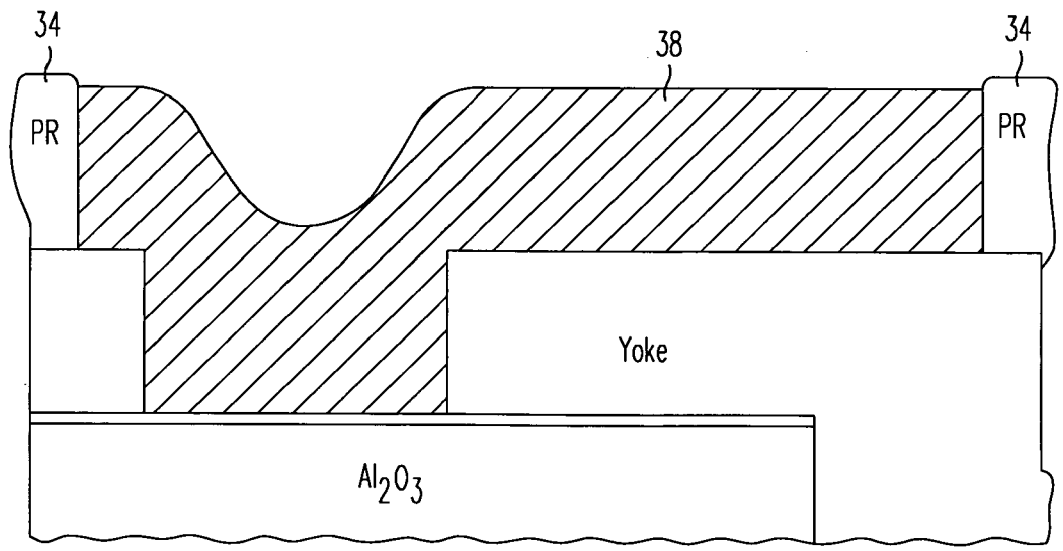
Figure 11F:
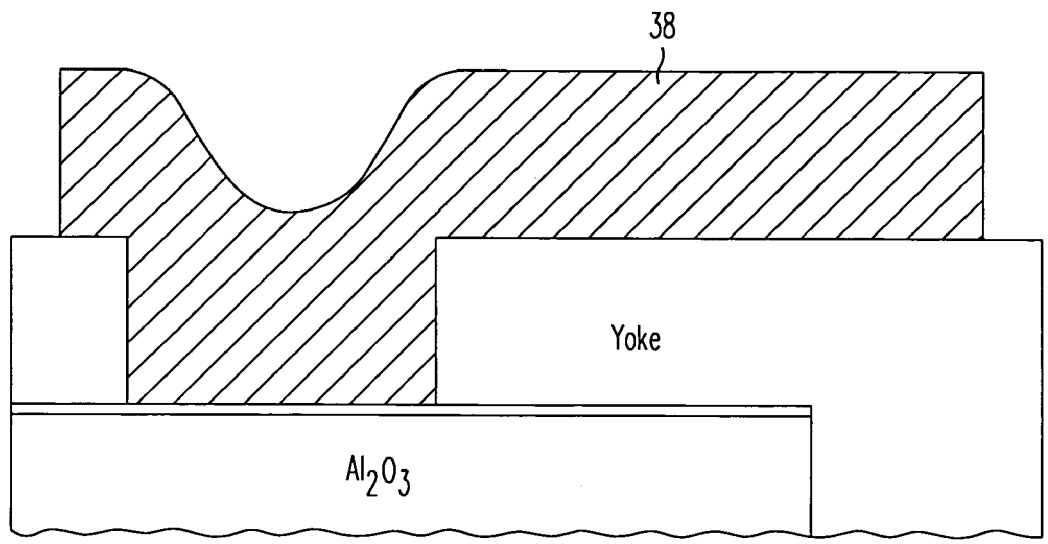

As shown in FIG. 11E, a NiP layer 38 is plated in opening 36 and on NiP seed layer. NiP layer 38 may be 5-7 μm thick, for example. Photoresist layer 34 is removed, as shown in FIG. 11F.

Figure 11G:
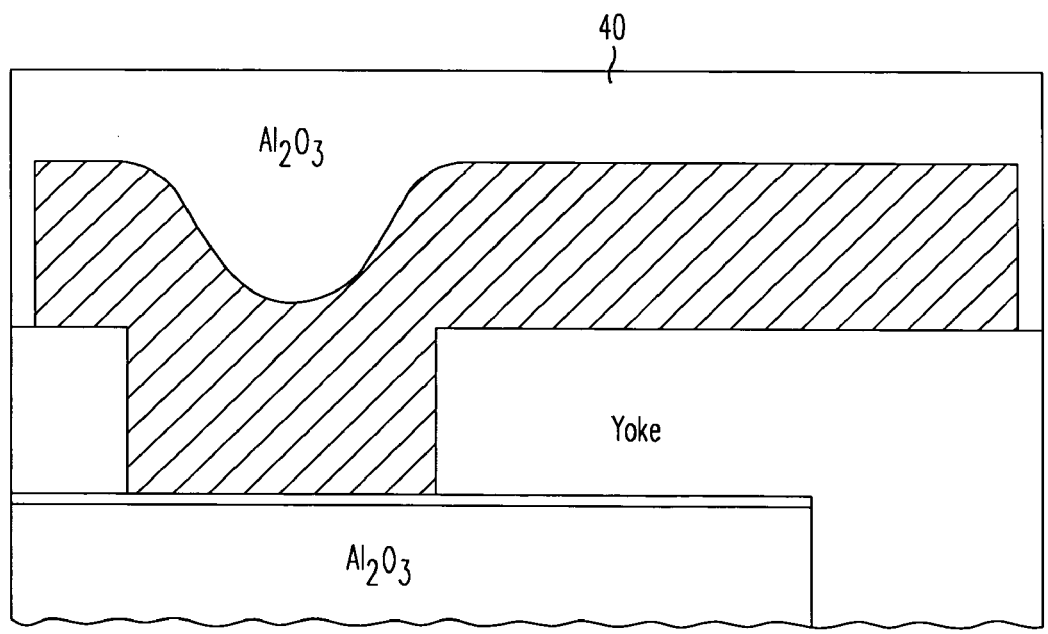
Figure 11H:
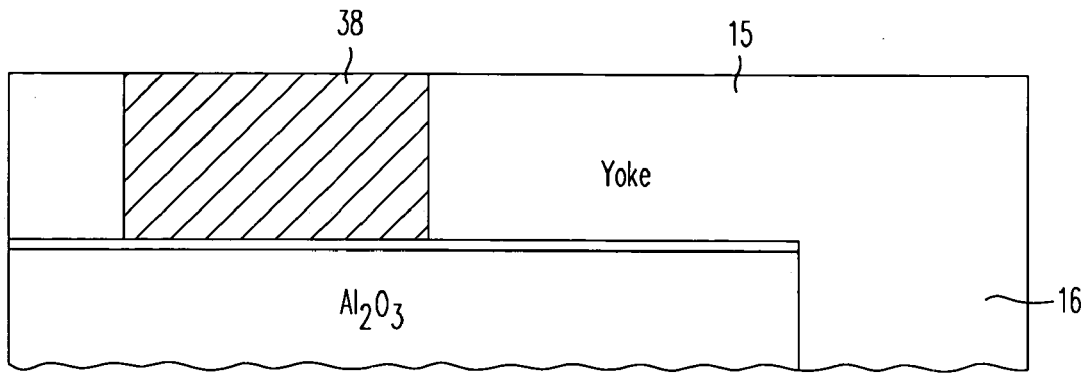

An $Al_2O_3$ layer 40 is then deposited over the entire surface of the structure to fill areas not shown in the drawings, as shown in FIG. 11G. The top surface of the structure is then polished by chemical-mechanical polishing (CMP) to a level below the top surface of yoke 15, leaving the structure shown in FIG. 11H.

Figure 11I:
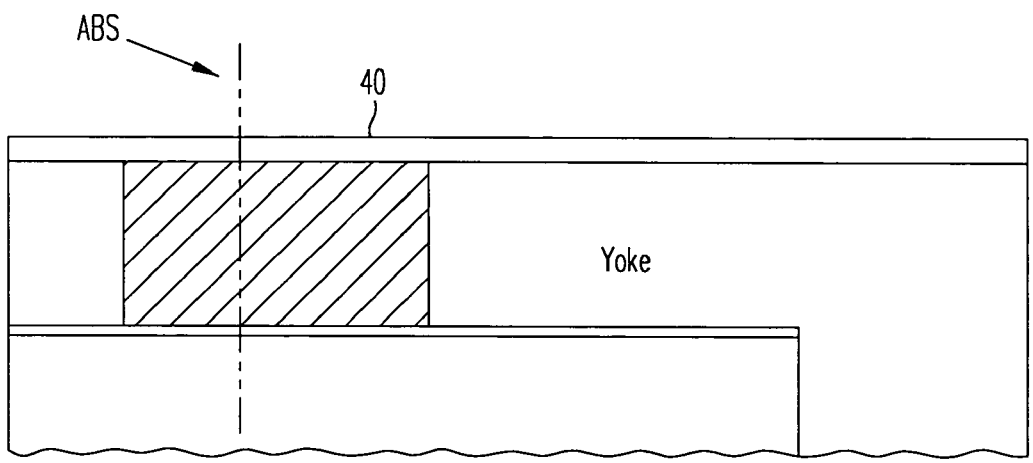
Figure 11J:
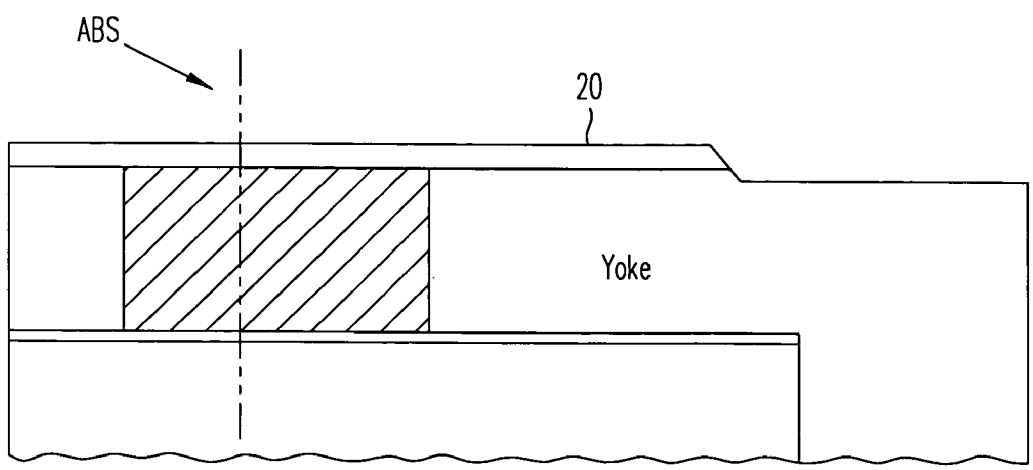

Next, as shown in FIG. 11I, a NiFe layer 40 is deposited to form a structure which will become main pole 20. NiFe layer 40 is then patterned to form a specified area of contact with yoke 15, as shown in FIG. 11J.

Figure 11K:
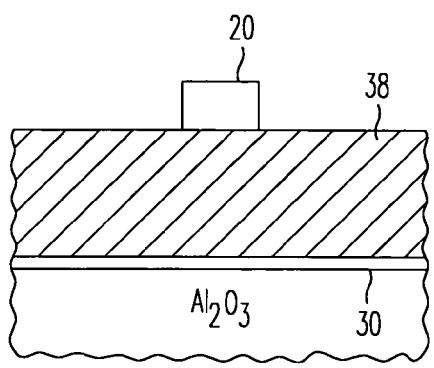
Figure 11L:
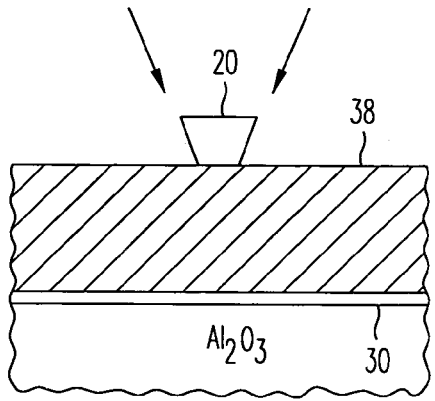

FIGS. 11K and 11L are views taken at the cross section labeled ABS in FIG. 11I. FIG. 11K shows how NiFe layer 40 is initially patterned to the width of main pole 20, and FIG. 11L shows how the sides of main pole 20 are beveled to a desired angle, using an ion milling process. Because layer 38 underneath main pole 20 is made of NiP, a relatively soft material as compared with $Al_2O_3$, a large angle can be formed, and there are no "fences" along the sides of main pole 20.

After the deposition of an $Al_2O_3$ layer over and around main pole 20, the structure is diced and polished along the cross section ABS to form the pole structure shown in FIG. 10.

As described above, it is helpful to maximize the area of contact between the yoke and the main pole because this provides a broader path for the magnetic flux to flow between these elements. According to another aspect of this invention, the bevel angle promotion layer is integrated with a leading edge taper layer to increase the area of contact between the yoke and the main pole.

Figure 12:
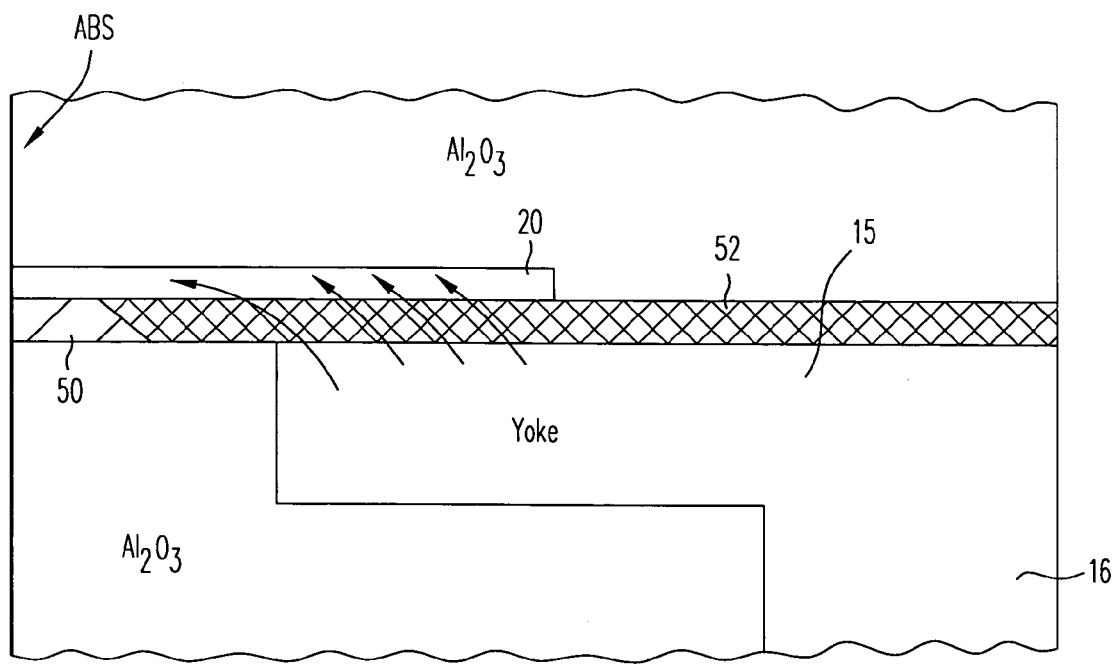
FIG. 12 is a cross-sectional view of a recording head wherein a bevel angle promotion layer is integrated with a leading edge taper layer to broaden the magnetic flux path.

A cross-sectional view of a main pole structure in accordance with this aspect of the invention is shown in FIG. 12. Main pole 20 overlies both a bevel angle promotion layer 50 and a leading edge taper layer 52. Promotion layer 50 is formed of a relatively soft non-magnetic material such as NiP, Rh, Ta, NiCr or Cd. Leading edge taper layer 52 is formed of a magnetic material such as NiFe. The interface between promotion layer 50 and leading edge taper layer 52 is located between the end of yoke 15 and the ABS. As a result, the magnetic flux can flow through the portion of leading edge taper layer 52 that is located between the end of yoke 15 and the ABS.

FIGS. 13A-13G illustrate the steps of a process for fabricating the structure shown in FIG. 12. Initially, the main pole, coil, yoke and intervening $Al_2O_3$ layers are formed in a conventional manner to arrive at the structure shown in FIG. 13A. The top surface of yoke 15 and $Al_2O_3$ layer 54 are coplanar.

Figure 13A:
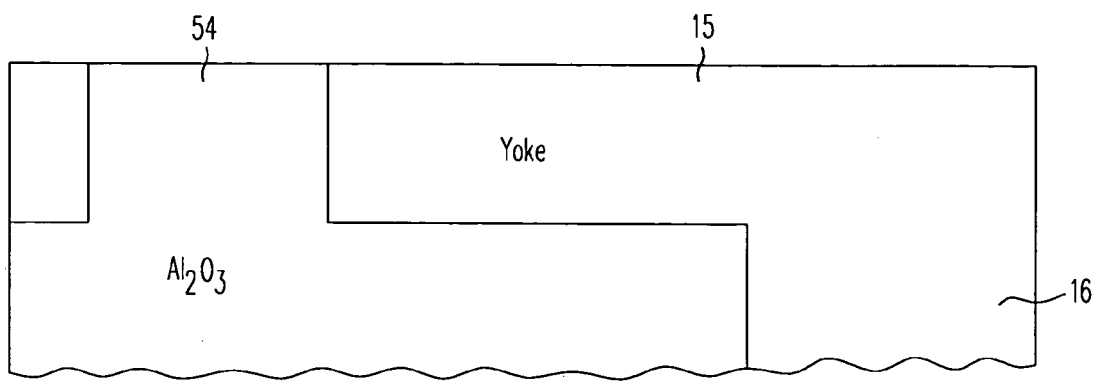
FIGS. 13A-13G illustrate a process of fabricating the recording head shown in FIG. 12.
Figure 13B:
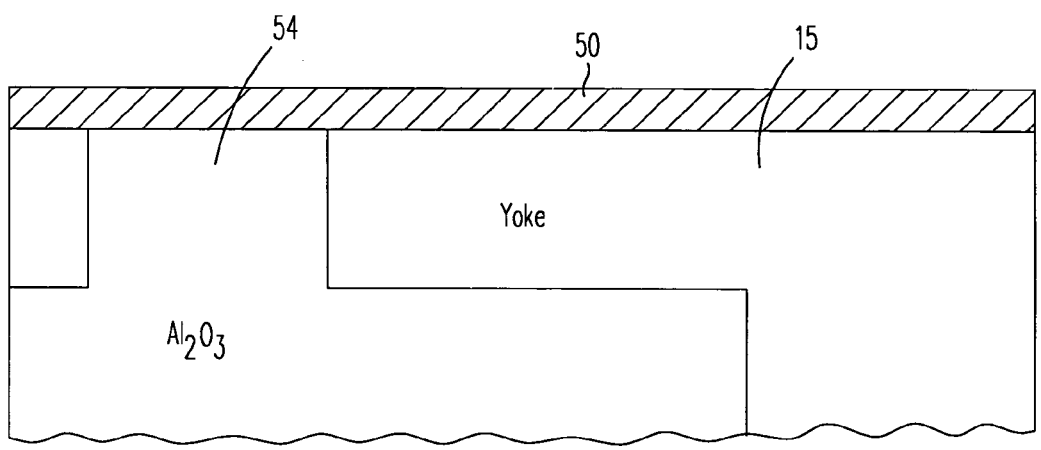

As shown in FIG. 13B, promotion layer 50 is deposited by chemical vapor deposition, sputtering, or another full film deposition method to a thickness of 10-300 nm, for example, on top of yoke 15 and $Al_2O_3$ layer 54. Promotion layer 50 can be formed of Rh, for example.

Figure 13C:
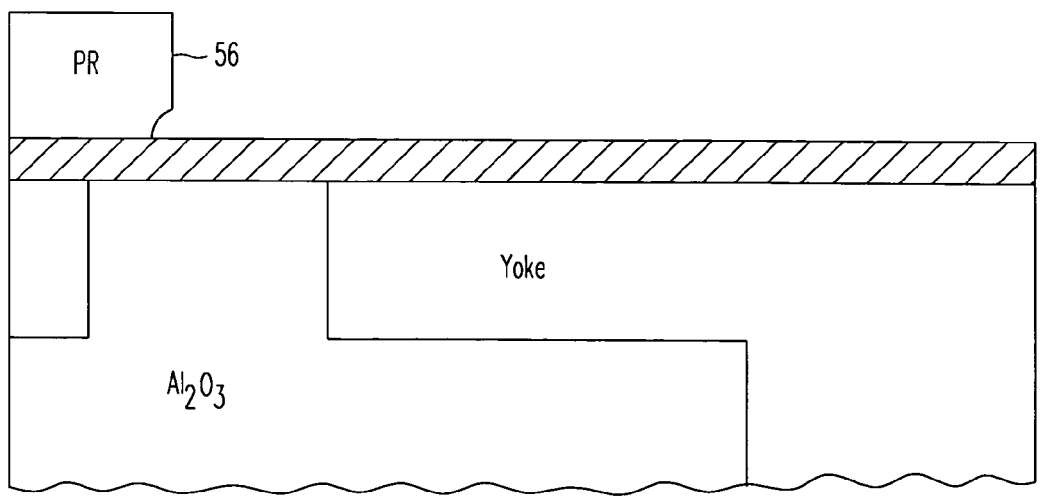

As shown in FIG. 13C, a lift off photoresist layer 56 is deposited and patterned such that an edge of photoresist layer 56 is located over $Al_2O_3$ layer 54 between the edge of yoke 15 and the plane of the ABS that is later to be formed.

Figure 13D:
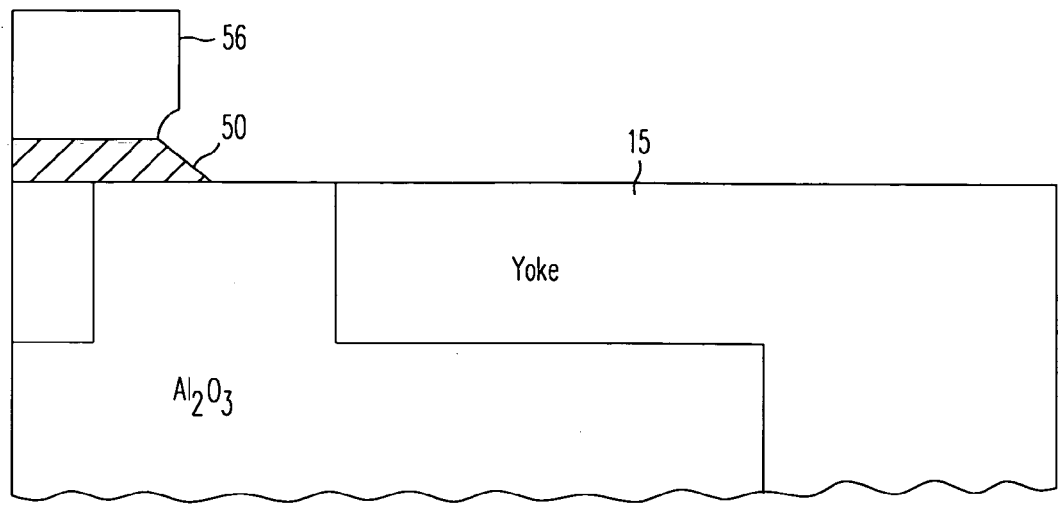

As shown in FIG. 13D, the portion of promotion layer 50 that is left exposed by photoresist layer 56 is removed by ion milling, leaving an angled edge that overlies $Al_2O_3$ layer 54. The ion beam can be programmed to transition through a desired sequence of angles.

Figure 13E:
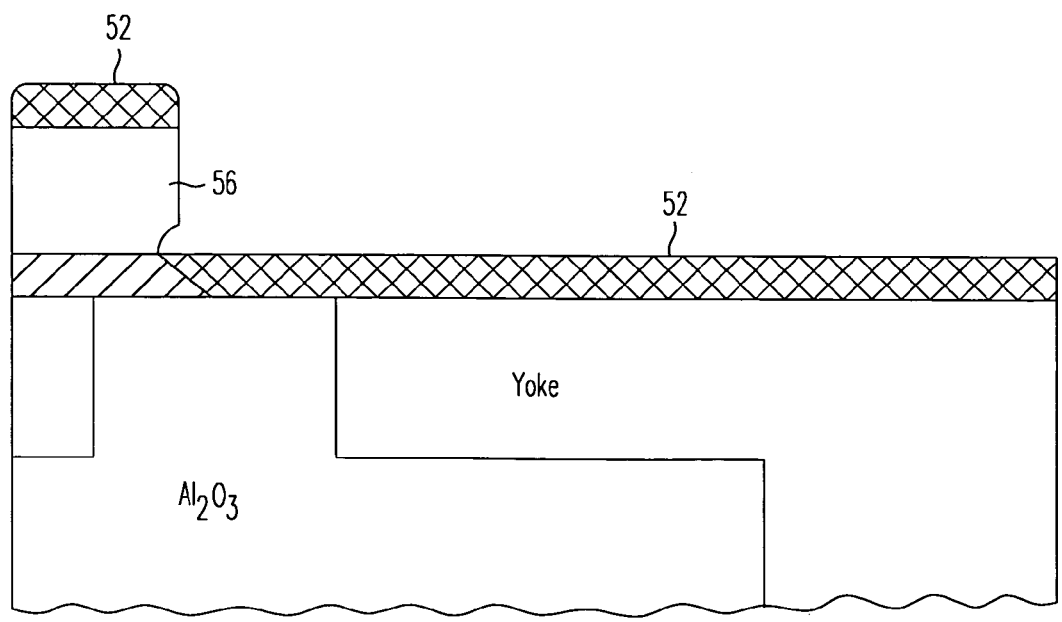

Next, as shown in FIG. 13E, the leading edge taper layer 52 is deposited. Leading edge taper layer 52 may be formed of NiFe. Because photoresist layer 56 is used as a mask both for the removal of a portion of promotion layer 50 and for the deposition of leading edge taper layer 52, the edges of promotion layer 50 and lead edge taper layer 52 abut each other at a location above $Al_2O_3$ layer 54. The lateral location of the edge of photoresist layer 56 determines the location of the interface between leading edge taper layer 52 and promotion layer 50 and hence the amount of leading edge taper layer 52 that will be available as a path for the magnetic flux flowing from yoke 15.

Figure 13F:
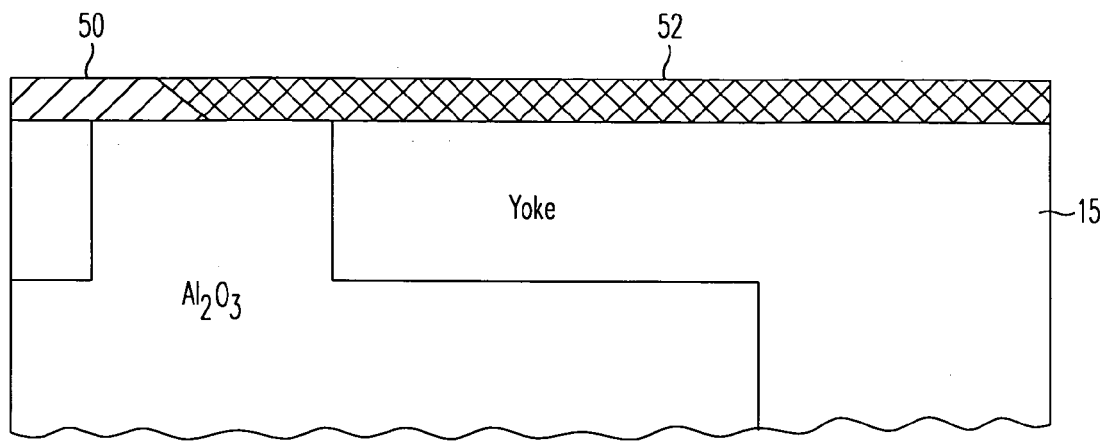
Figure 13G:
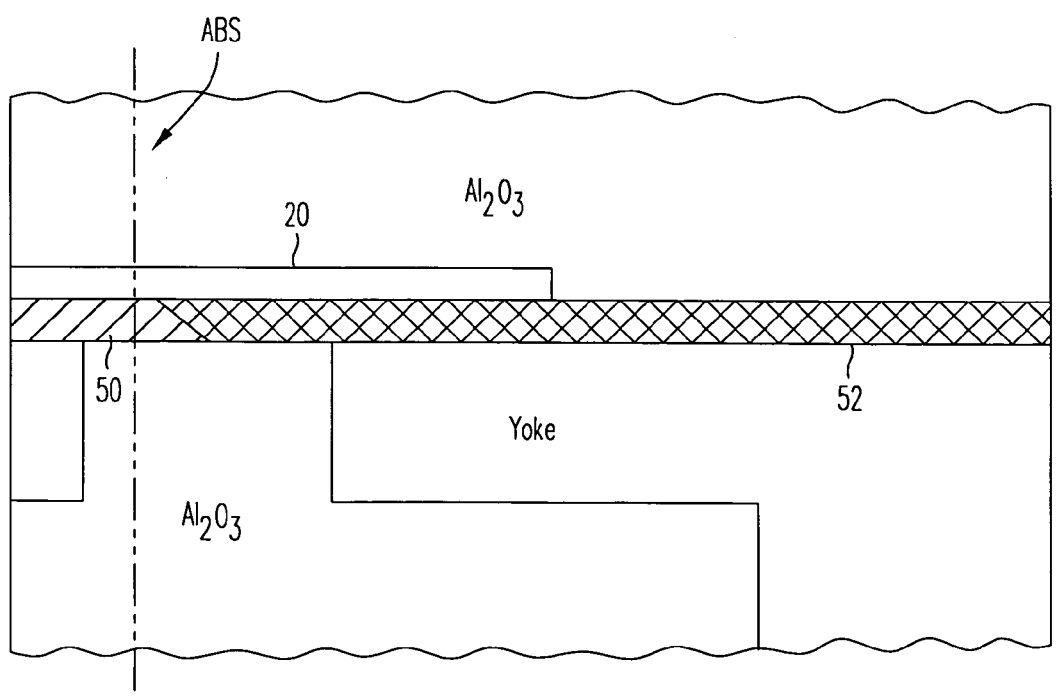

Photoresist layer 56 is then removed by a lift-off process, yielding the structure shown in FIG. 13F. The NiFe layer that will form the main pole 20 is deposited on top of leading edge taper layer 52 and promotion layer 50. The main pole 20 is patterned and shaped by ion milling as described above in connection with FIGS. 11K and 11L. The presence of the relatively soft promotion layer 50 in the area of the ABS allows the bevel angle α to be made larger than if the main pole 20 were located over a harder material such as $Al_2O_3$, for example. Thereafter an $Al_2O_3$ layer is deposited over the main pole 20 and the structure is diced at the ABS (denoted by the dashed line in FIG. 13G) to produce the structure shown in FIG. 12. This unique structure allows two desirable objectives to be satisfied simultaneously: namely, the fabrication of a main pole having a trapezoidal shape with a large bevel angle and the creation of a broad path for the magnetic flux to flow between the yoke and the main pole.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

We claim:

1. A magnetic recording head comprising an auxiliary pole, a back gap, a yoke, and a main pole, each formed of a magnetic material and all connected in a magnetic flux path, said auxiliary and main poles terminating at an air bearing surface, wherein:

said yoke is located on a nonmagnetic layer made of a first material, said nonmagnetic layer being located between said yoke and said auxiliary pole;

said main pole is located on a bevel angle promotion layer made of a second material, said second material being softer than said first material; and said main pole has a trapezoidal shape in a cross section parallel to said air bearing surface.

2. The magnetic recording head of claim 1 wherein a top surface of said bevel angle promotion layer is coplanar with a top surface of said yoke.

3. The magnetic recording head of claim 1 wherein said bevel angle promotion layer is located between an end of said yoke and said air bearing surface.

4. The magnetic recording head of claim 1 wherein said second material is selected from the group consisting of NiP, Rh, Ta, NiCr and Cd.

5. The magnetic recording head of claim 4 wherein said first material is $Al_2O_3$.

6. The magnetic recording head of claim 1 wherein said magnetic flux path further comprises a leading edge taper layer formed of a magnetic material, said leading edge taper layer being sandwiched in said magnetic flux path between said yoke and said main pole, said yoke having an end facing said air bearing surface, an end of said leading edge taper layer being located closer to said air bearing surface than said end of said yoke.

7. The magnetic recording head of claim 6 wherein said bevel angle promotion layer is located between said leading edge taper layer and said air bearing surface.

8. The magnetic recording head of claim 7 wherein a first end of said bevel angle promotion layer abuts an end of said leading edge taper layer.

9. The magnetic recording head of claim 8 wherein an interface between said bevel angle promotion layer and said leading edge taper layer is at an oblique angle with respect to said air bearing surface.

10. The magnetic recording head of claim 8 wherein a second end of said bevel angle promotion layer is located at said air bearing surface.

11. The magnetic recording head of claim 6 wherein said main pole abuts said bevel angle promotion layer and said leading edge taper layer.

* * * * *